United States Patent [19]

Droulon et al.

[11] Patent Number: 5,090,264
[45] Date of Patent: Feb. 25, 1992

[54] TAKING UP DEVICE OF ANGULAR CLEARANCES ON ARTICULATION MECHANISMS USED IN SEATS, PARTICULARLY OF AUTOMOBILES

[75] Inventors: Georges Droulon, Flers; Alain Romagne, Aubusson, both of France

[73] Assignee: Ets. Cousin Freres, Orne, France

[21] Appl. No.: 546,399

[22] Filed: Jun. 29, 1990

[30] Foreign Application Priority Data

Jul. 3, 1989 [FR] France .................. 89-08891

[51] Int. Cl.$^5$ .................. F16D 1/12; F16D 3/10
[52] U.S. Cl. .................. 74/411; 403/229; 403/298; 464/160; 464/161; 475/162
[58] Field of Search .................. 74/411, 470, 409; 464/160, 161; 403/229, 298; 297/355; 475/162

[56] References Cited

U.S. PATENT DOCUMENTS

| | | | |
|---|---|---|---|
| 1,034,249 | 7/1912 | Kennington | 464/160 X |
| 1,708,923 | 4/1929 | Cole | 464/161 |
| 1,828,305 | 10/1931 | Zeder et al. | 464/160 |
| 2,010,489 | 8/1935 | Ice | 464/161 X |
| 2,616,274 | 11/1952 | Landrum | 464/160 X |
| 3,146,756 | 10/1964 | Shimanckas | 464/160 X |
| 3,443,449 | 5/1969 | Kotarski | 74/411 X |
| 4,371,207 | 2/1983 | Wilking et al. | 475/162 X |
| 4,747,796 | 5/1988 | Iwai et al. | 464/160 X |
| 4,943,116 | 7/1990 | Ohwada et al. | 475/162 X |

FOREIGN PATENT DOCUMENTS

| | | | |
|---|---|---|---|
| 588412 | 1/1978 | U.S.S.R. | 464/161 |
| 2111641 | 7/1983 | United Kingdom | 464/160 |

Primary Examiner—Allan D. Herrmann
Assistant Examiner—Julie Krolikowski
Attorney, Agent, or Firm—Robert W. Becker & Associates

[57] ABSTRACT

The articulation mechanisms is made particularly of irreversible satellite mechanisms connected to one another by a connection bar. The connection bar has, on one of its portion, a member with toothings subjected to action of a spring which, when the connection bar is in position between two cams of the articulation mechanisms, causes a rotation of these cams and of the satellites related thereto for taking up the manufacturing and mounting clearances.

6 Claims, 5 Drawing Sheets

TAKING UP DEVICE OF ANGULAR CLEARANCES ON ARTICULATION MECHANISMS USED IN SEATS, PARTICULARLY OF AUTOMOBILES

FIELD OF THE INVENTION

In vehicle seats, more especially in automobile vehicles, it is now usual to position, between the seating portion armature and the seat back armature, mechanisms or fittings allowing varying the inclination of the seat back with respect to the seating portion. These mechanisms can also be used for an adjustment of the position of the seating portion, and in some cased, for an adjustment of the head-rest on the upper portion of the seat back.

These mechanisms, which use different setting and blocking systems, are generally called continuous articulations since they use irreversible satellite mechanisms (epicycloidal gear train) which are automatically blocked as soon as the seat has been adjusted by rotating, either via a control button or via a motor, the control member providing for the rotation of the mechanism.

However, such satellite articulations, called continuous, have the disadvantage of the existence of slight clearances in the toothings in the mountings of each control cam, despite and extremely elaborate manufacture. Since two mechanisms are needed, one on each side of the seat back, the upper portion of the seat back is therefore slightly mobile over a small but visible angle, this being a drawback refused systematically by the automobile drivers.

The use of such continuous articulations has however the advantage of being easy to use and little costly, and it is the reason why different means have been provided for avoiding or at least taking up the clearances of the two mechanisms mounted in parallel so as to give to the seat back, the seating portion etc., a stable position without "rattling" which is prejudicial to the esthetics and to the passenger comfort.

OBJECT OF THE INVENTION

The aim of the present invention is to remedy this difficulty by creating a connection rod or bar taking up the clearance between the two articulation mechanisms, which connection rod or bar is necessary for the concomitant operation of the mechanisms and provide at the same time a good stability for these mechanisms without increasing the cost price of the assembly since the manufacture of the connection rod or bar is simple, little costly and extremely easy to mount, and in some cases mounted on an automatic machine.

SUMMARY OF THE INVENTION

According to the invention, the taking up device of angular clearances on articulation mechanisms used in seats, particularly of automobiles, made particularly of irreversible satellite mechanisms (epicycloidal gear train) connected to one another by a connection bar, is characterized in that a portion of the connection bar is provided with a toothed member that is subjected to the action of a spring and, when the connection bar is in position between the two cams of the articulation mechanism, causes the rotation of these cams of the satellites associated therewith for taking up the manufacturing and mounting clearance so as to avoid untimely displacement by torsion of the seat back.

According to another feature of the invention, the taking up device of the angular clearances on mechanisms used in seats, particularly of automobiles, made particularly or irreversible satellite mechanisms (epicycloidal gear train) connected to one another by a connection bar is characterized in that it is made of two tube segments having each, at their free end, a formation, the other end being engaged on splined cylindrical extensions rigidly connected to male and female claw couplings including each one tooth for forming a wolf-tooth clutch, the male claw coupling being extended, on the inner side, by a cylindrical element penetrating a central cavity formed in the female claw coupling, then the tubes include each through-pegs serving as fixation points for a helical spring centered on the male and female claw couplings, and providing, when the connection rod thus made is in position between the cams of the irreversible satellite mechanisms, a taking up of the clearances of these cams, of the satellite and of the toothings of the mechanisms by a rotation of the springs which transmits its effort via the through-pegs of the formation terminating the tubes.

According to another feature of the invention, a stirrup-fork maintains normally the spring under tension by cooperating with the positions provided on the tubes in their median zones, is removed after mounting and thereby releases the tension of the spring for taking up the clearances.

Various other features of the invention will become more apparent from the following detailed description.

Embodiments of the object of the invention are shown by way of non limiting examples in the accompanying drawings.

DESCRIPTION OF AN EMBODIMENT OF THE INVENTION

Figure 1:
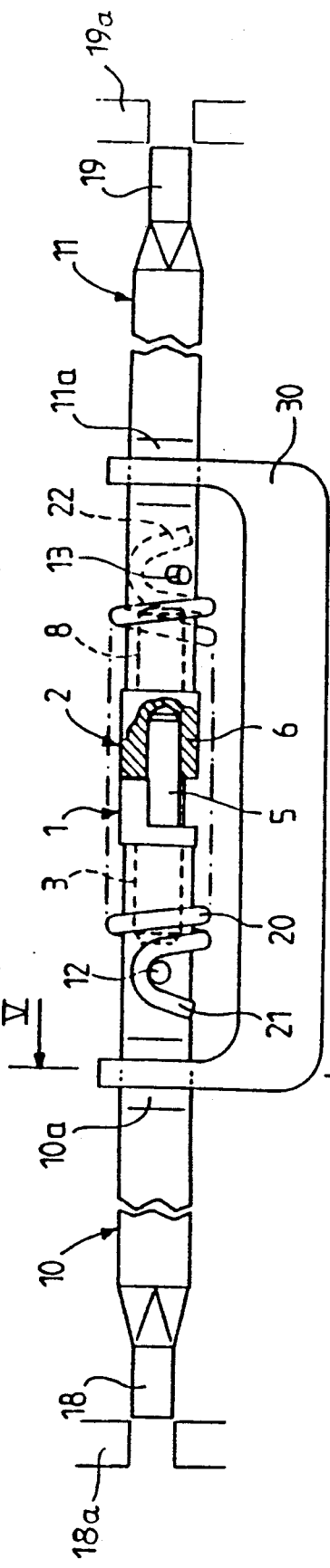
FIG. 1 is a longitudinal elevation view, partly in section, of the angular clearance take up bar on a so-called continuous articulation.
Figure 7:
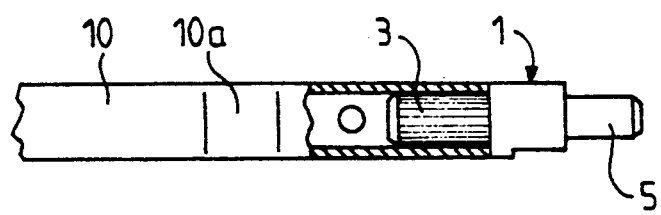
FIG. 7 is a side elevation view of one of the elements of the rod.
Figure 8:
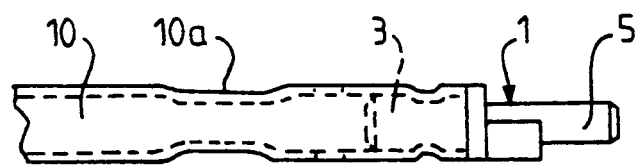
FIG. 8 is an elevation view, partly in section, of the elements corresponding to FIG. 7.
Figure 9:
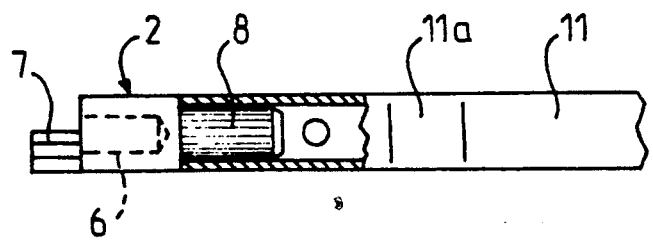
FIG. 9 is a partial elevation view, partly in section, of a rod portion mounted on the male claw coupling.
Figure 10:
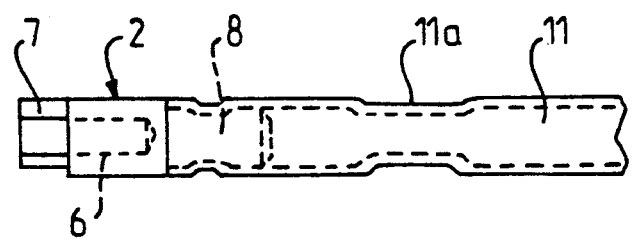
FIG. 10 is a plan view corresponding of FIG. 9.

In FIG. 1 there is shown the central portion, partly cut out, of the male and female claw couplings 1, 2 (see also FIG. 7), a claw coupling being a type of male-female wolf-teeth.

Figures 11, 12:
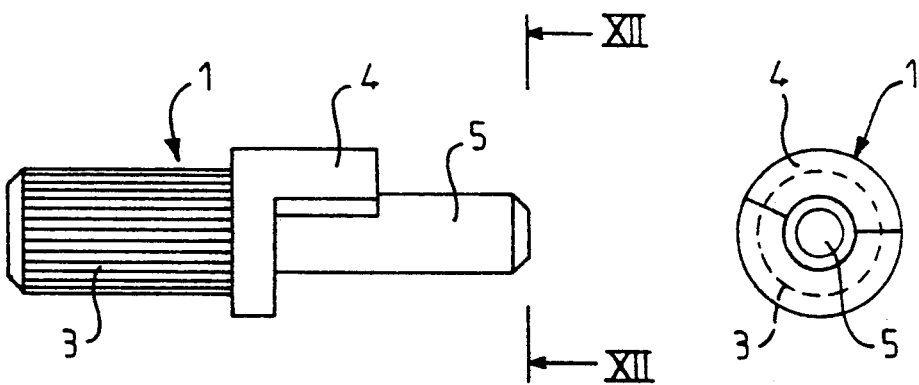
FIG. 11 is a side elevation view of the male claw coupling.
FIG. 12 is a front view of the male claw coupling along line XII—XII of FIG. 11.
Figures 13, 14:
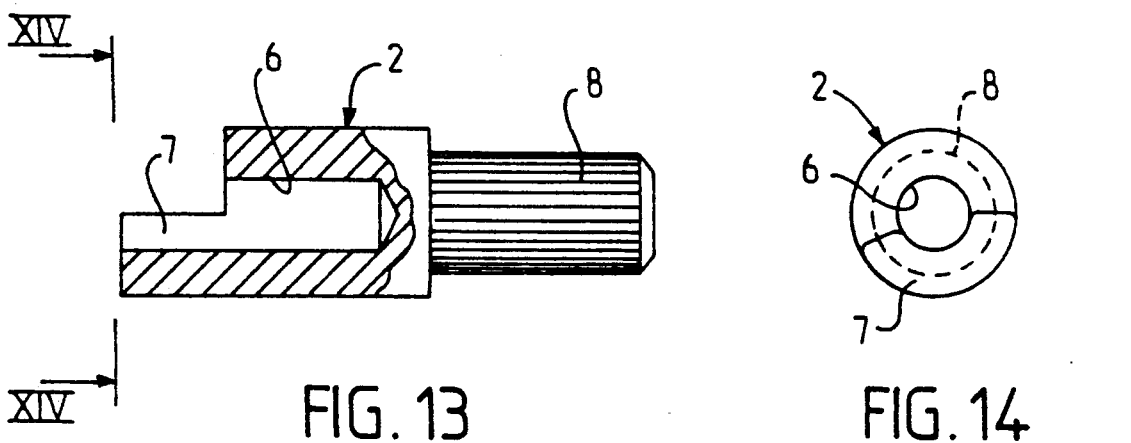
FIG. 13 is a side elevation view, partly cut out, of the female claw coupling.
FIG. 14 is a front view of the female claw coupling along line XIV—XIV of FIG. 13.
Figure 15:
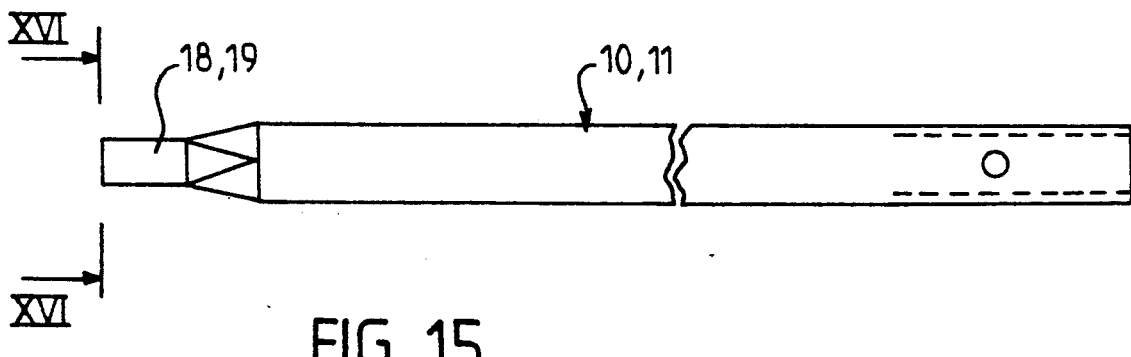
FIG. 15 is a side elevation view of a half rod made of a shaped tube.

As better shown in FIGS. 11 and 12, the male claw coupling 1 is made of a rod 3 which is splined and which ends in a tooth 4 concentrical to rod 3 and also concentrical to a cylindrical extension 5. The extension 5 is provided for extending into a cavity 6 formed in the center of a cylindrical tooth 7 of the female claw coupling 2 which terminates into a splined rod 8 (see FIGS. 13, 14).

Turning again to FIG. 1, one sees that when the male and female claw couplings 1, 2 are in place, the teeth are in mesh and the splined rods 3 and 8 are in the prolongation of one another and can therefore be each covered by tubes 10, 11 normally cylindrical and having each in their median region through-pegs 12, 13 which are latched inside the holes formed in these tubes 10, 11.

Figure 5:
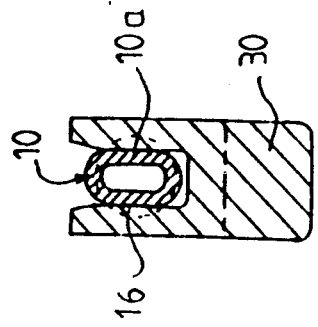
FIG. 5 is sectional view along line V—V of FIG. 1.
Figure 4:
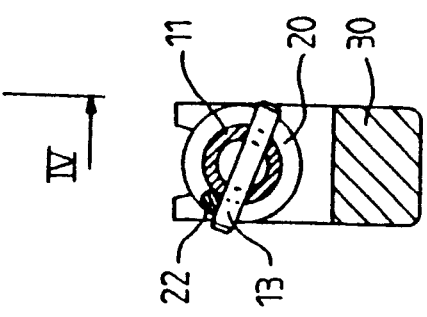
FIG. 4 is a sectional view along line IV—IV of FIG. 1.
Figure 3:
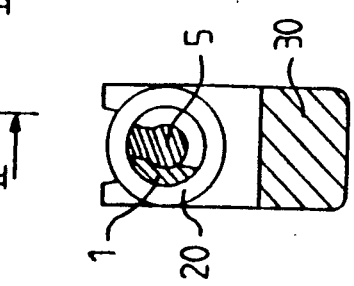
FIG. 3 is sectional view along line III—III of FIG. 1.
Figure 2:
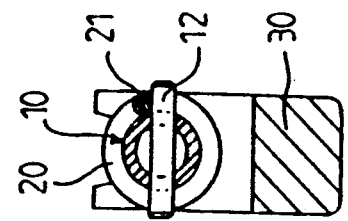
FIG. 2 is a sectional view along line II—II of FIG. 1.

It should be remarked that tubes 10, 11 have in their median zone 10a, 11a a flat portion 16 (see FIG. 5) the purpose of which will be explained hereafter.

Figure 16:
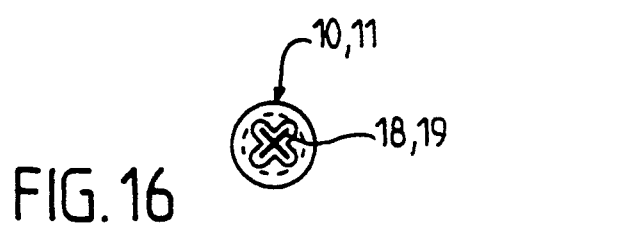
FIG. 16 is a front view along line XVI—XVI of FIG. 15.

Moreover, tubes 10, 11 terminates into end formations 18, 19 having in section the shape of a cross (see FIG. 16) adapted for extending into the central control recess of each fitting.

Figure 6:
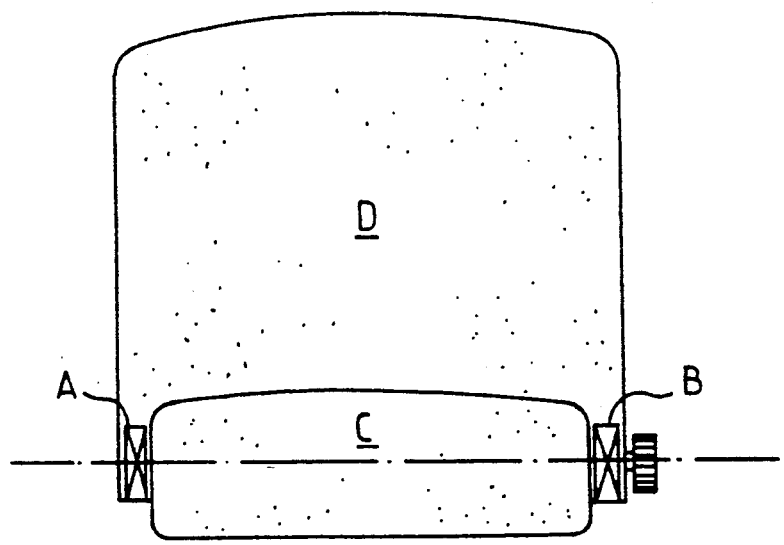
FIG. 6 shows in elevation one of the elements of the rod when being mounted.

In the preferred use of the invention to the adjustment of a seat of an automobile vehicle, the end formations 18, 19 are provided to be mounted in the control cams (diagrammatically shown at 18a and 19a in FIG. 1) of the left-hand side and right-hand side articulations of the seat, as shown at A and B in FIG. 6.

And as shown in in FIG. 1, a helical spring 20 is placed between the two through-pegs 12, 13 so that one end 21 of the spring 20 will bear against peg 12 while the other end 22 of spring 20 is not in contact with the through-peg 13. Therefore, when the clearance take up connection tube so made is mounted, when the end formations 18, 19 are in place inside a cam forming the control member of each left hand-side and right hand-side articulations of the seat, there is a slight torsion of spring 20 since the spring 20 has been retained in an extended position by a stirrup-fork 30 the branches of which are introduced on the flat portions 16 (see FIG. 5).

Thus, there is a slight rotation in the reverse direction, of the two tubes 10, 11, which causes a slight rotation of the control cams 18a, 19a of the articulations A, B. Thus, the toothings of each double satellite of each articulations A, B, will come into contact with the toothings of the fixed and mobile flanges of each articulations A, B placed between the seating portion C and the seat back D of the seat in consideration (see FIG. 6) by reducing thus to zero the unavoidable clearances of the toothings during manufacture of the satellites and of the toothings of the flanges.

Thus, the angular clearance provided at the origin on each of the control cam is completely taken up, as well as the clearances of the toothings and of the centering bearings. These clearances being suppressed, unpleasant the feeling of a slight swelling at the top of the seat back D in consideration has disappeared, which is the desired object.

Due to its design and its mounting, the clearance take up connection tube of the invention allows therefore a rapid and easy mounting of the junction member placed between the two articulations A, B, thus allowing, either with the assistance of a manual control, or with the assistance of an electric motor, adjusting the position of the seat back D with respect to the seating portion C according to the user's requirements.

Figure 17:
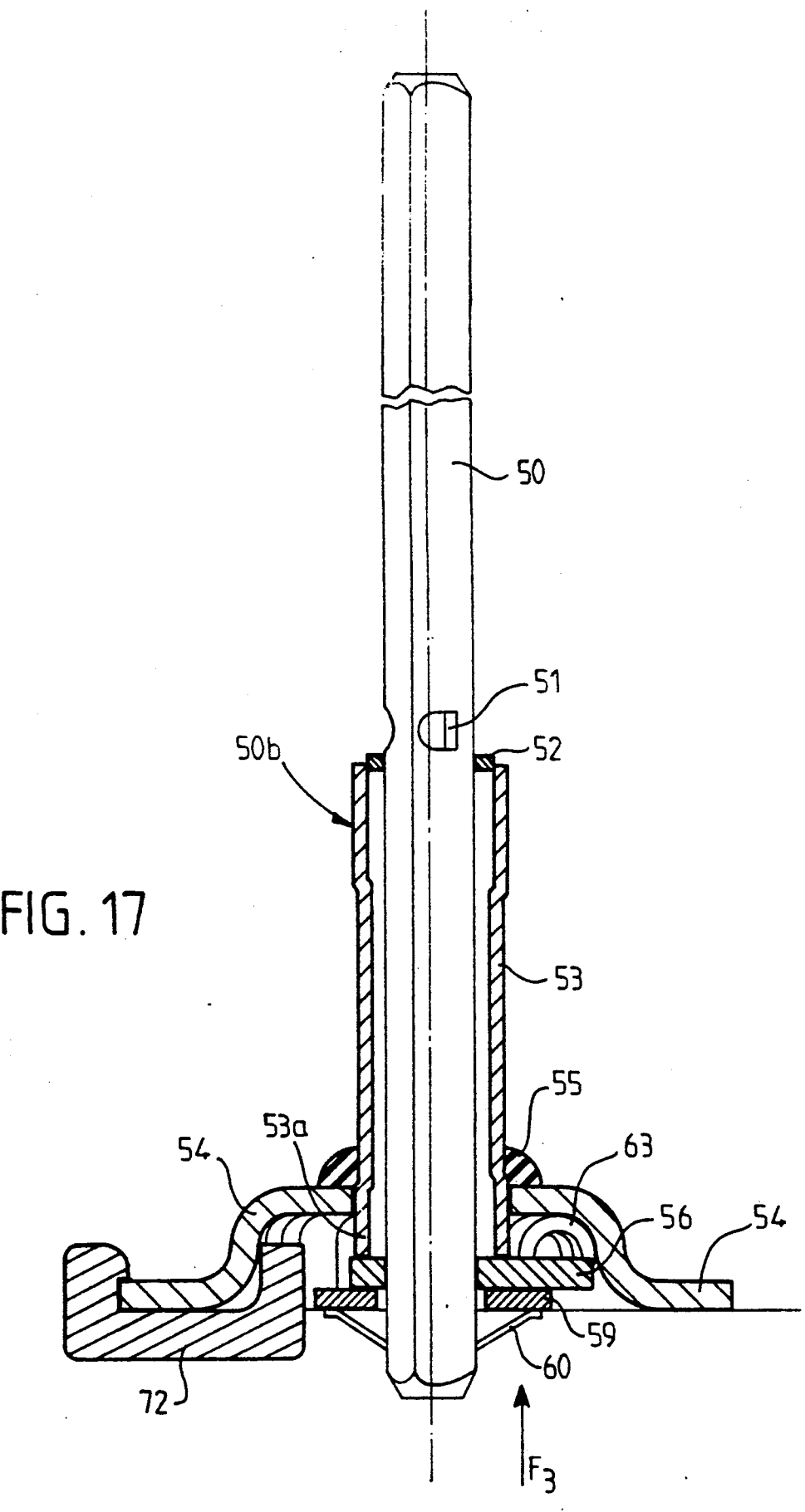
FIG. 17 is a longitudinal elevation and sectional view of a variant of the angular clearance take up device for articulation mechanisms.

FIG. 17 is a plan view, partly in cross section, showing a second embodiment of the angular clearance take up device of the invention, which is formed mainly of a connection square bar 50 having, at one of its ends, a pin 51 for serving as an abutment for a washer 52 which comes to bear on one flared out end 50b of a guiding tube 53 also out in toward its other end 53a, for receiving a button carrier plaquette 54 formed as a cup. The junction of the cup-shaped button carrier plaquette 54 with the guiding tube 53 is provided by soldering 55.

As shown in FIG. 17, the guiding tube 53, via its end 53a which is slightly flared out, extends inside the button carrier plaquette 54 so as to form an abutment for a driving part 56 (see also FIG. 18) of a generally circular shape but having two protuberances 57, 58 forming a set of cams placed at 120° one with respect to the other.

The driving part 56 is retained by a retaining grid 59 and a grid-latch 60.

Figure 18:
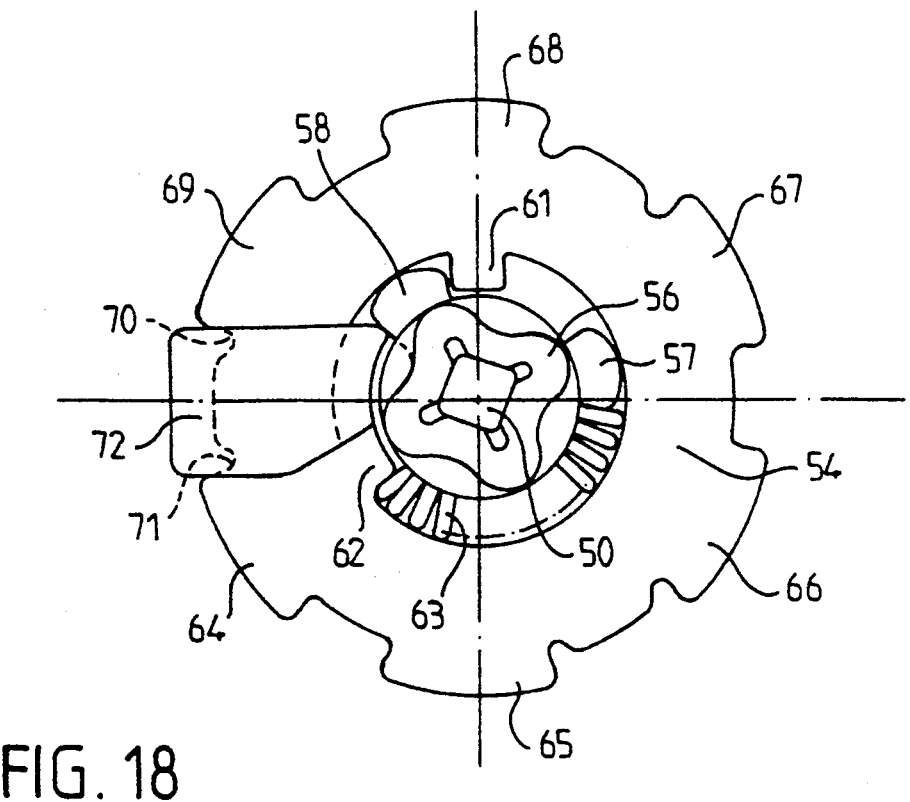
FIG. 18 is a front view, substantially in the direction of arrow F3 of FIG. 17.

Finally and as shown in FIG. 18, the cup-shaped button carrier plaquette 54 has in its center two fingers 61, 62 equally offset by 120° and serving as abutments for the protuberance 58 and so that finger 62 forms an abutment for a compression spring 63 the other end of which is bearing against the protuberance 57. It should be pointed out also that the outer limit of the cup 54 is serrated at 64, 65, 66, 67, 68, 69 and is formed with particular cut-outs 70, 71 for receiving a rider 72 forming an abutment-latch and which is removable as described hereafter. The serrations 64 to 69 serve also in a usual manner to the fixation of the control button which controls, via the connection square rod 50, the two articulations which are placed one at the free end of the connection square 50 and the other in the zone 50b in front of the pin 51.

Actually, when the above mentioned two articulations of the seat back are mounted, one can automatically put in position the connection square bar 50 by introduction in the holes provided in the center of two cams forming the control member of the two articulation mechanisms of the respective seat back.

Figure 19:
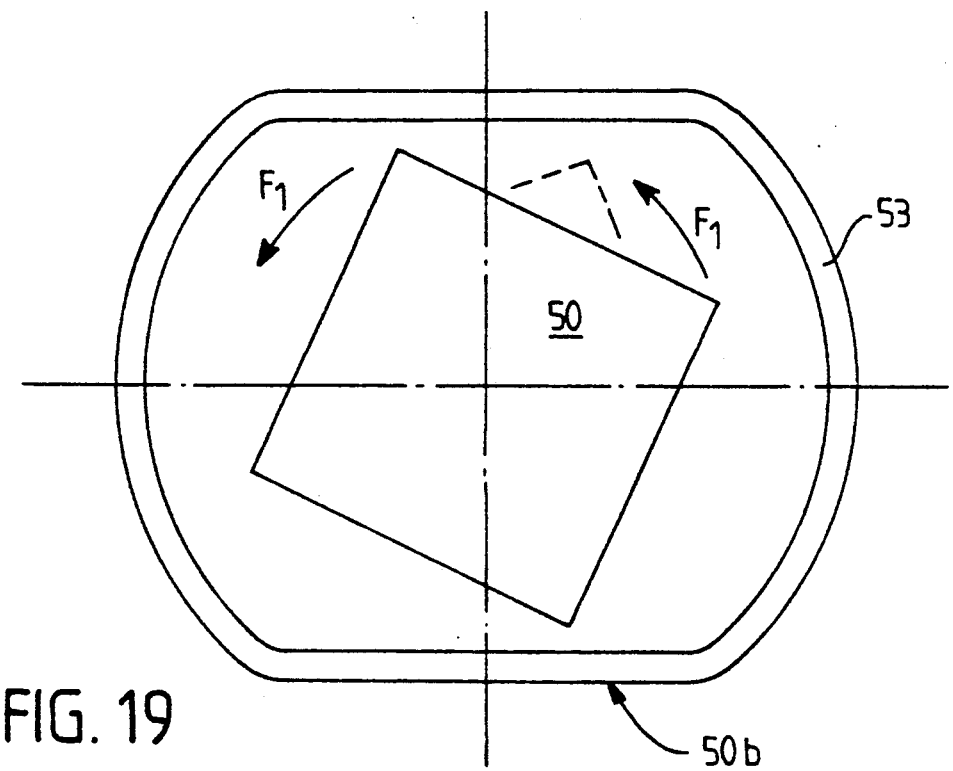
FIG. 19 is an operational diagram.

When this operation is completed, one can remove the abutment latch forming rider 72 which is most often made of a plastic material. Since the spring 63 has been stretched when put in position between finger 62 and protuberance 57, the spring 63 loosens slightly, and causes one of the above mentioned cams to rotate (see FIG. 19) in the direction of arrow F1, over an angle of 40° to 50° and generally of 45°, thereby causing a rotary movement of the two cams so that they take up the manufacturing and mounting clearances, and the satellites, which are rigidly connected thereto and also rotate, take up the manufacturing clearances and tolerances of the toothings.

Therefore, this movement has for its effect that, since the articulation mechanisms are slightly blocked, the clearances rearwardly on one of the sides of the seat and frontwardly on the other side of the seat are taken up and thus, considering that the armature of the seat back is rigidly connected to this junction bar, the seat back does not exhibit any more the clearance movement which is prejudicial to a good comfort for the passenger.

This assembly is simple to manufacture as well as to mount since this can be effected automatically on a machine. The cost price of this articulation clearance taking up device is small and meets perfectly the cost characteristics required by the manufacturers.

It should be pointed out that the connection bar 50, the driving part 56, the cup 54 and the various other parts are made of a current metal which does not necessitate any surface treatment, and the mounting of this connection bar offers no difficulty.

The hereabove description has been made on the basis of articulation mechanisms for a seat back, but the mounting will be the same for the articulation mechanisms mounted on the seat rising blocks using the same articulation mechanisms.

We claim:

1. In a device for taking up angular clearances on articulation mechanisms used in seats, particularly of automobiles, that are connected to one another by a connection bar, the improvement wherein:

a portion of said connection bar is provided with toothed means that is subjected to the action of a spring, and when said connection bar is in position between two cams of said articulation mechanism, said spring causes rotation, via respective ends of said connection bar that are engaging said cams, of said cams for taking up manufacturing and mounting clearances so as to avoid untimely displacement by torsion of a seat back; and said toothed means comprises a male and a female claw coupling, each of which is provided with a respective tooth to form a wolf-tooth-clutch, with said male claw coupling being provided on an inner side with a cylindrical element that extends into a central cavity of said female claw coupling, with ends of said male and female couplings opposite said element and cavity thereof being respectively provided with a splined cylindrical extension; and in which said device further comprises two tube segments each of which has two ends, one of which is provided with a formation for operative connection to one of said cams, while the other end of each of said tube segments engages one of said splined extensions of said male and female coupling, with each of said tube segments being provided with a trough-peg that serves as a fixation point for said spring, which is a helical spring that is concentric to said male and female couplings and upon rotation transmits its action via said through-pegs to said formations of said tube segments to effect said taking up of said clearances.

2. A device according to claim 1, which includes a stirrup-fork that is removably disposed on portions of median zones of said tube segments for maintaining said spring under tension prior to mounting said connection bar in position, whereby removal of said stirrup-fork releases said tension of said spring to effect said taking up of said clearances.

3. A device according to claim 1, in which each of said formations of said ends of said tube segments is in the form of a cross to permit easy penetration into each of said cams.

4. In a device for taking up angular clearances on articulation mechanisms used in seats, particularly of automobiles, that are connected to one another by a connection bar, the improvement wherein:

a portion of said connection bar is provided with toothed means that is subjected to the action of a spring, and when said connection bar is in position between two cams of said articulation mechanism, said spring causes rotation, via respective ends of said connection bar that are engaging said cams, of said cams for taking up manufacturing and mounting clearances so as to avoid untimely displacement by torsion of a seat back; and said toothed means is in the form of a driving part that is provided with two protuberances; and in which said connection bar comprises a bar of square section having two ends, at one of which a guide tube is provided, a first end of said guide tube being disposed at a free end of said connecting bar and welded to a cup that forms a support for a control button, and a second end of said guide tube, disposed along a longitudinal extension of said connection bar, is held in position relative to said connection bar by a pin that extends perpendicularly from said connection bar and by a washer that is supported at said second end of said guide tube; with a central portion of said cup being provided with two fingers that are disposed approximately 120° from one another, with one of said fingers retaining a rider that blocks one of said protuberances of said driving part, which is disposed on said connection bar, with the other of said protuberances of said driving part serving as an abutment for a first end of said spring, which is in the form of a compression spring, a second end of which is disposed against one of said fingers of said cup, with a retaining grid and a grid latch being provided for retaining such an assembly on a control button side.

5. A device according to claim 4, in which said rider is fixed on an outer periphery of said cup by engaging cut-outs thereof.

6. A device according to claim 5, in which said rider is made of plastic.

* * * * *